3,454,508
POLYMETHYLOL PHENOL AND
PHENOLIC RESINS
Franklin W. Herrick and Louis H. Bock, Shelton, Wash.,
assignors to ITT Rayonier Incorporated, Shelton, Wash.,
a corporation of Delaware
No Drawing. Filed Nov. 30, 1956, Ser. No. 625,209
Int. Cl. C08g 5/06, 5/18, 51/14
U.S. Cl. 260—17.5        7 Claims

ABSTRACT OF THE DISCLOSURE

Water insoluble alcohol soluble polymethylol phenols characterized by a mol ratio of 2.3 to 2.52 of formaldehyde to phenol are prepared by arresting the alkaline polymerization, washing out inorganic materials below 10° C. and condensing with lignin to give resins of low water absorption and high dielectric properties.

---

This invention relates to the components for forming thermosetting phenolic resins and to compositions for forming such resins, and has for its object the provision of an improved polymethylol phenol, a process for producing the polymethylol phenol, and a thermosetting resin composition comprising the polymethylol phenol and an alkali lignin.

The typical phenol-formaldehyde condensate used for laminating varnish is prepared by reacting phenol with 1 to 2 moles of aqueous formaldehyde in the presence of ammonia as a catalyst until an insoluble resin phase separates. The water is removed by distillation and the condensate is dissolved in alcohol to make the laminating varnish.

The phenol-formaldehyde condensates heretofore produced from polymethylol phenol have either been highly condensed with such a loss of free methylol groups that there was ineffective cross-linking with other phenolic material, or they were either uncondensed monomeric phenols or condensed to such a low extent that they were soluble in water and not washable with water to remove electrolytes.

Alkali lignin has been used commercially in the laminating and molding arts alone and in combination with the common phenol-formaldehyde resins. While the end products have been satisfactory for certain uses, they have been inferior where high dielectric properties, water resistance and dimensional stability are essential. For such purposes, pure phenol-formaldehyde resins are used.

A conventional phenol-formaldehyde resin has also been used with lignin primarily to improve the thermoplasticity of the product, but the cured product is not improved since the phenol-formaldehyde does not react with the lignin to produce a thermosetting resin.

Various lignin-phenol resins have been described based on the reaction of lignin with phenol under acid or alkaline conditions. These products are thermoplastic but do not cure under the conditions used in making laminates. Addition of formaldehyde to such a condensate results in a thermoset product but the reaction cannot be controlled to yield a suitable laminating resin which can be applied and cured under conventional laminating conditions.

The improved polymethylol phenol of our invention is characterized by having a formaldehyde to phenol ratio of from 2.30 to 2.52, freedom from inorganic constituents, and a state of condensation in such a narrow range that it is water insoluble but soluble in polar organic solvents, and is advantageously useful for forming laminating varnishes, as a component of thermosetting phenolic resin compositions, as a curing agent for other phenolic materials, and for other purposes where thermosetting condensates that yield insoluble, infusible products are useful. The polymethylol phenol is soluble in such organic solvents as the lower alcohols and is compatible with natural occurring phenolic materials such as lignin, quebracho and phenolic constituents of bark. Compositions of the polymethylol phenol and such naturally occurring phenolic materials are thermosetting and can be used to make molding compounds, and paper laminates with properties equivalent to those made with conventional phenolic laminating resins. We have found that by the use of our improved polymethylol phenol as much as 80% of the total laminating resin can be replaced with alkali lignin to give laminates of acceptable properties.

In accordance with the process of our invention the polymethylol phenol is prepared by reacting phenol with 2.5 to 3.0 moles of aqueous formaldehyde in the presence of 0.25 to 1.0 moles of sodium hydroxide. This reaction is highly exothermic and if allowed to go to completion will result in a highly condensed product with a low ratio of free methylol groups. It is important for the purpose of this invention that the ratio of free methylol groups be as high as practical since the methylol groups serve as the cross-linking agents to convert other phenolic material such as lignin into a resin. The condensation of the polymethylol phenol must be carefully controlled to a degree where neutralization of the sodium hydroxide will result in practically complete precipitation of the polymethylol phenol in a form that can be washed free of inorganic salts.

Phenol has three reactive positions and each molecule can react with three molecules of formaldehyde. When a mixture of phenol and excess formaldehyde is heated under alkaline conditions, an insoluble, infusible resin is formed in which the ratio of formaldehyde to phenol is about 1.5 to 1.6. If the condensation went infinitely far the ratio would be 1.5 but actually there are end groups which may contain free methylol groups so the ratio is slightly above 1.5. If trimethylol phenol is heated in the presence of alkali, it will form the same end-product with a formaldehyde-to-phenol ratio of about 1.5 to 1.6. The excess formaldehyde is split out in the reaction. We have found that a polymethylol phenol compound such as trimethylol phenol, or a low condensed polymethylol phenol having a formaldehyde-to-phenol ratio of over 2.0 can be mixed with alkali lignin, quebracho or other natural polymeric phenolic material and that the mixture can be cured to form an insoluble, infusible resin.

It is important that the polymethylol phenol condensate used in the present invention contains a high ratio of free methylol groups to serve as cross-linking agents in the resin formation. Formaldehyde reacts very rapidly with phenol in the presence of a high molar ratio of sodium hydroxide. In the presence of about 0.75 mole of sodium hydroxide per mole of phenol, the reaction with formaldehyde is strongly exothermic and the reaction mixture heats up to refluxing temperature of its own accord. If the reaction mixture is cooled rapidly after the exotherm has subsided the solution is free of formaldehyde, provided the molar ratio of formaldehyde-to-phenol is less than 3. The Cannizzaro reaction in which formaldehyde is converted to methanol and sodium formate is also favored by high mole ratios of sodium hydroxide and high temperature. However, the reaction rate of the Cannizzaro reaction is slower than the rate of reaction of formaldehyde with phenol under these conditions. If the strongly alkaline solution of polymethylol phenol is heated, another reaction occurs which results in the condensation of the polymethylol phenol to a polymer and the simultaneous liberation of formaldehyde.

The formation of trimethylolphenol, its condensation and the Cannizzaro reaction are illustrated by the following equations:

(a) 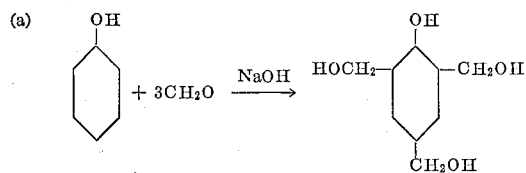

(b) 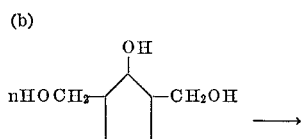

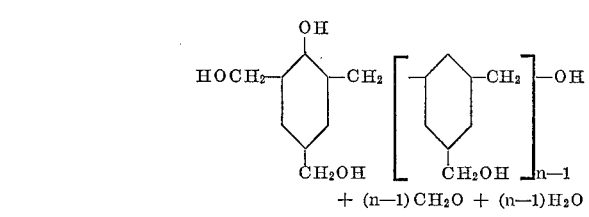
+ (n—1)CH₂O + (n—1)H₂O (c)    2CH₂O + NaOH  ⟶  NaOOCH + CH₃OH

In reaction (b) free formaldehyde is liberated and a polymer containing a lower ratio of formaldehyde to phenol is formed. This reaction should be controlled within certain limits since it results in fewer methylol groups to serve as cross-linking agents in resin formation. The Cannizzaro reaction (c) should be avoided since it results in the loss of valuable formaldehyde.

It has been found in carrying out the reaction of phenol with formaldehyde, as practiced in this invention, that the product consists of a mixture of monomeric polymethylol phenols and low molecular weight condensation products. This is in agreement with the published work of Freeman, J. Am. Chem. Soc. 74, 6257 (1952) and Anal. Chem. 24, 955 (1952) who demonstrated the formation of dimers. Kammerer, Makromol, Chem. 8, 85 (1952) also showed that polymethylol phenols split out formaldehyde when heated with alkali, as indicated in equation (b). It would be desirable to limit the reaction of formaldehyde and phenol so as to form only monomeric products, since then full use of the formaldehyde could be made as methylol groups in cross linking and resin formation. This is, however, not practical since the reaction of formaldehyde with phenol is too slow at low temperature and the higher temperature used to promote the reaction also promotes the condensation to polymeric products. Furthermore, the monomeric products such as trimethylolphenol are soluble in water so that their isolation free of inorganic impuritits would be difficult and costly. Therefore, a compromise must be reached by maintaining the reaction mixture at elevated temperature only long enough to effect complete reaction of the formaldehyde and to carry the condensation far enough to produce products which are readily precipitated from solution and washed free of salts. The consendation to polymers is held to a minimum by cooling to stop the reaction as soon as the optimum degree of condensation has been reached.

Assuming that all the available positions ortho and para to the hydroxyl are reacted with formaldehyde, at the end of the heating period the degree of condensation can be estimated as follows:

Referring to equation (c) it is evident that the only reaction resutling in the disappearance of sodium hydroxide is the Cannizzaro reaction and that each mole of sodium hydroxide consumed in this reaction corresponds to the disappearance of two moles of formaldehyde. In order then to determine the number of moles of formaldehyde involved in the Cannizzaro reaction, it is only necessary to determine by titration the number of moles of sodium hydroxide consumed and to multiply by 2. The number of moles of formaldehyde combined with phenol is obtained by subtracting the number of moles involved in the Cannizzaro reaction from the total added at the start of the reaction. Dividing by the number of moles of phenol used in the reaction gives the ratio of combined formaldehyde to phenol.

If $x$ is the molar ratio of combined formaldehyde to phenol and $n$ is the average number of phenol units in a molecule of product, the degree of polymerization is obtained by the equation:

$$n = \frac{1}{x-2}$$

Actually it is difficult to obtain a combined ratio of formaldehyde to phenol above 2.5, and examples given in this specification range in value from 2.45 to 2.52. The corresponding $n$ values, therefore, range from 2.08 to 1.92. In other words, the predominating chain length is about two phenol units.

This polymethylol phenol forms by itself an excellent resin for laminating varnish.

When the polymethylol phenol is added to a solution of lignin or other phenolic material there is substantially no reaction at room temperature. Such a solution can be stored for weeks with only a slight increase in viscosity. When the solution is evaporated and the residue is heated there is a condensation involving the methylol groups of the polymethylol phenol and the phenolic nuclei in the phenolic material as illustrated in the following equation in which

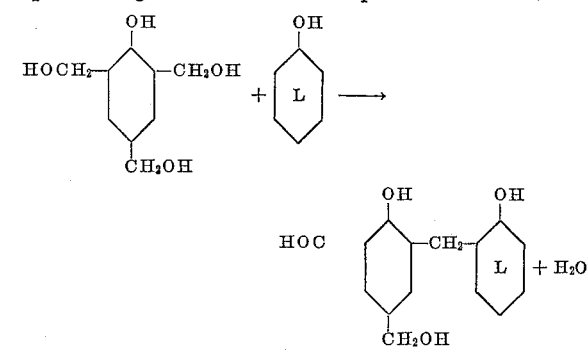

This reaction can continue until a three dimensional solid polymer is formed.

The thermosetting resin composition of our invention comprises the improved polymethylol phenol and an alkali lignin, which, when reacted with the polymethylol phenol, forms an insoluble, infusible resin. Advantageously, the invention provides a laminating resin composition in the form of varnish which is soluble in alcohol, free of inorganic material and has particular utility for forming electrical insulation laminates of paper or cloth. The resin composition can also be used effectively for forming molding compounds.

The resin composition of our invention is based upon our discovery that our polymethylol phenol and an alkali lignin both of which are soluble in organic solvents and free of inorganic material are compatible. The composition can be stored for long periods under ordinary temperatures without an appreciable change in viscosity, but when heated forms an insoluble, infusible resin. The components of the resin forming composition are soluble in such solvents as methanol and ethanol and when the composition is dissolved in such solvents it forms an improved laminating varnish, especially suitable for electrical insulation because of its low moisture absorption and high dielectric properties. The alcoholic solution of these components can be applied to laminating paper or fabric and treated in the conventional way to produce laminated sheets with excellent physical properties.

Alkali lignin suitable for use in this invention can be obtained from the waste liquors of the alkaline pulping of any wood by the soda or sulfate process, such as Southern yellow pine, Western red cedar, Douglas fir, Western hemlock, gum (*Nyssa fiblora, Nyssa aquatica* or *Liquidambar styraciflua*), or chestnut. The alkali lignin is obtained by acidifying the black liquor containing the sodium salt of alkali lignin, with a mineral acid or carbon dioxide to a pH of 7.0 to 1.0 to precipitate the alkali lignin which is washed with water until substantially free of inorganic salts. This alkali lignin is quite soluble in methanol or ethanol.

In preparing resin forming compositions especially suitable for forming laminating varnish, the degree of condensation of the polymethylol phenol must be controlled within rather narrow limits. If the degree of condensation is too low the product is too soluble in water and it is impossible to wash it free of salts without severe loss of material. However, any low condensed product can be used if the inorganic salts are removed by some other means, such as by ion exchange. On the other hand, if the condensation is carried too far the number of free methylol groups is insufficient to properly cure the lignin and form a water resistant infusible resin. We have found that the degree of condensation corresponding to a combined formaldehyde-to-phenol mole ratio of 2.3 to 2.52 is suitable for the purpose of this invention. This corresponds to an average chain length of 3.3 to 2.0. The range of viscosity of the original alkaline solution is 37 to 150 centipoises when prepared under the conditions described in Example I.

The following examples illustrate the preparation of our polymethylol phenol:

Example I

A reaction vessel equipped with mechanical agitator, reflux condenser, cooling jacket and temperature recorder was charged with 25.4 parts of 94.5% phenol and 54 parts of 37% formaldehyde. The solution was cooled to 20–35° C. and 20.6 parts of 36% sodium hydroxide solution was added. The agitator was started and the temperature rose from the heat of reaction to 65° C. in 13 minutes. Cooling water was then turned into the jacket and the temperature rose more gradually to 85° C. in 8 minutes. Hot water was then turned into the jacket to bring the reaction temperature to 92° C. where the mixture refluxed. The hot water was then turned off and the mixture continued to reflux for 30 minutes at which time cold water was turned into the jacket to cool the mixure and stop the reaction. The resulting solution had a specific gravity of 1.195, a cured resin solids of 47.2% and a viscosity at 25° C. of 41 centipoises. Analysis as outlined above indicated a combined formaldehyde-to-phenol ratio of 2.45.

To the above solution was added 67 parts of ice and 33 parts of water. The mixture was stirred and 9.5 parts of sulfuric acid in 38 parts of water was added keeping the temperature below 10° C. The product separated as a heavy syrup. The aqueous layer had a pH below 2 and was removed by decantation. The material was washed four times with cold water by stirring, settling and decanting. To the washed product was added 19.8 parts of methanol to give 64.1 parts of a clear solution containing 47.0% cured resin solids. The yield of resin is 88.8% of theory based on the phenol used. The solution had a viscosity of 22 centipoises at 25° C.

Example II

An alkaline polymethylol phenol solution was prepared using the weights of reagents given in Example I but stopping the refluxing at 20 minutes to give a solution with a viscosity of 37.5 centipoises and a combined formaldehyde-to-phenol ratio of 2.52. The product was precipitated with sulfuric acid and washed as described in Example I. The washed product amounted to 44 parts containing 66% cured resin solids. The yield of resin is 85.2% of theory based on the phenol used.

The condensate of Example II was made into a laminating varnish and when used with Formica 6 mil electrical grade paper the resulting laminate had a flexural strength of 21,900 p.s.i. and a water absorption of only 1.1.

The alkali lignin used in the following examples was prepared from the black liquor obtained by digestion of various woods by the Kraft process. The lignin was precipitated by heating the black liquor solution to 71° C. and adding sulfuric acid to a pH 2.0. The solution was then heated to 88° C. and agitated for 30 minutes, following which it was cooled to 70° C., filtered and washed with water. Finally, it was dried to a free flowing powder.

The following examples illustrate the preparation of compositions comprising polymethylol phenol and alkali lignin:

Example III

A laminating solution was prepared using the polymethylol phenol of Example I and an alkali lignin made as above described from Southern pine at a weight ratio of 0.4. It was formulated by mixing 55 parts of the resin solution containing 47% cured resin solids, 65.5 parts of lignin (containing 2% moisture) and 79.5 parts of methanol. The resulting solution contained 45% cured

| Lignin | Ratio PF to Lignin | Percent Resin | Percent Volatiles | Viscosity, cp. | Flexural Strength | Water Abs. | Tensile | Impact |
|---|---|---|---|---|---|---|---|---|
| S. Pine | .6 | 38.2 | 3.2 | 61 | 22,550 | 1.0 | | |
| Hemlock | .6 | 33.2 | 3.6 | 49 | 22,100 | 1.7 | | |
| D. Fir | .6 | 32.8 | 3.6 | 49 | 21,200 | 1.8 | | |
| Gum | .6 | 34.7 | 1.9 | 52 | 21,500 | 2.0 | | |
| Cedar | .6 | 33.9 | 3.4 | 72 | 21,000 | 1.6 | | |
| Chestnut | .6 | 32.2 | 4.7 | 62 | 21,400 | 1.5 | | |
| S. Pine: | | | | | | | | |
| $CO_2$ precipitated | .1 | 41.4 | 4.0 | 250 | 23,500 | 1.8 | | |
| $CO_2$ precipitated, $H_2SO_4$ washed | .1 | 35.1 | 3.8 | 94 | 23,600 | 2.0 | | |
| $H_2SO_4$ precipitated at pH 4 | .6 | 39.3 | 4.9 | 205 | 18,800 | 2.5 | | |
| S. Pine | .05 | 35.1 | 3.0 | 158 | 16,800 | 6.8 | | |
| Do | .1 | 34.1 | 2.7 | 105 | 17,300 | 2.7 | | |
| Do | .2 | 35.2 | 4.4 | 84 | 18,800 | 3.1 | 11,600 | .95 |
| Do | .6 | 38.2 | 3.2 | 61 | 22,550 | 1.0 | | |
| Do | .8 | 35.3 | 3.1 | 37 | 20,900 | 1.9 | 17,900 | .93 |
| Do | 1.0 | 32.8 | 3.3 | 45 | 22,100 | 1.9 | | |
| Do | 1.2 | 32.3 | 4.5 | 45 | 21,700 | 1.9 | | |
| Do | a .6 | 30.2 | 5.4 | 258 | 16,800 | 7.0 | | |
| Do | b .4 | 37.7 | 3.1 | 97 | 21,050 | 1.3 | | | a Polymethylol phenol had a combined formaldehyde-to-phenol mole ratio of 2.3 and an initial viscosity in the alkaline solution of 150 centipoises.
b Polymethylol phenol had a combined formaldehyde-to-phenol mole ratio of 2.52 and an initial viscosity in the alkaline solution of 37.5 centipoises.
PF=Phenol formaldehyde condensate.

resin solids (lignin and polymethylol phenol) and had a viscosity of 97 centipoises. This solution was used to impregnate .010" caliper laminating paper by dipping and drying, first at room temperature and finally 10 minutes in an oven at 100° C. The impregnated paper contained 37.7% resin and 3.1% volatiles. A laminate was prepared by assembling a stack of sheets and pressing at 160° C. and 1500 p.s.i. for 30 minutes. The resulting laminate had a thickness of 0.10 inch, a flexural strength of 21,050 p.s.i. and a water absorption of 1.3% when tested according to the procedure of the American Society of Testing Materials, D 570–42.

Using the above procedure, laminates were prepared using lignin from various woods and using various ratios of polymethylol phenol to lignin. In addition, the degree of condensation of polymethylol phenol was varied in the last two samples, the rest of the preparations being made with the same polymethylol phenol used in Example I. The lignin was alkali lignin prepared from Kraft liquor as described above.

Aqueous laminating solutions were prepared by dissolving the polymethylol phenol and the alkali lignin in aqueous ammonia instead of in an alcohol. The following example illustrates this procedure.

Example IV

A polymethylol phenol solution was prepared as in Example I. The original solution had a viscosity of 40 centipoises at 44% cured resin solids. This solution was treated with dilute sulfuric acid at 0–10° C. to precipitate the free polymethylol phenol which was washed with cold water to remove acid and salt. The final washed product contained 64% cured resin solids. A solution was prepared by dissolving 1204 parts of washed polymethylol phenol in 800 parts of water and 22 parts of ammonium hydroxide. The resulting solution contained 38% cured resin solids and had a pH of 8.6.

A laminating solution was prepared by dissolving 50 parts of alkali lignin from the digestion of Southern pine in 50 parts of water and 48 parts of 28% ammonium hydroxide. To this solution was added 131 parts of the ammoniacal polymethylol phenol solution described in this example. The resulting solution contained 35.9% cured resin solids at a polymethylol phenol to lignin ratio of 1.0 and had a viscosity of 35.9 centipoises.

The solution was applied to laminating paper by dipping. This application required care since the paper is very weak when wet. The paper was dried first at room temperature and finally 10 minutes in an oven at 100° C. The impregnated paper contained 41.2% resin and 3.3% volatiles. The sheets were stacked and pressed at 1500 p.s.i. and 160° C. for 30 minutes. The resulting laminate had a thickness of 0.10 inch, a flexural strength of 22,500 p.s.i. and a water absorption of 1.4.

Example V

A molding powder was prepared by mixing 100 parts (dry basis) of a standard molding powder grade of wood flour with a solution containing 68.5 parts of a water-insoluble polymethylol phenol resin prepared by the process of Example II (73% cured resin solids), 50 parts of alkali lignin, 16.2 parts of 28% aqueous ammonia, 5 parts of triethanolamine and 365 parts of water. The impregnated wood flour mixture was then dried to about 4% moisture content and ball milled for 30 minutes with 1 part of zinc stearate. In the resulting molding powder, the ratio of polymethylol to lignin was 1.0 and the powder contained 50% wood flour.

Samples of the foregoing molding powder were pressed at 2000 p.s.i. using a curing time of 3 minutes and a temperature of 150° C. to form ⅛ inch thick standard specimens. These specimens had a flexural strength of 8830 p.s.i. and a water absorption of 0.8% (as determined by ASTM methods D790 and D570). Similar specimens prepared in the same way from the polymethylol phenol resin along and 50% wood flour had a flexural strength of 9910 p.s.i. and a water absorption of 0.73%.

We claim:

1. The process for producing polymethylol phenol which comprises reacting phenol with from 2.5 to 3.0 moles of aqueous formaldehyde in the presence of from 0.25 to 1.0 moles of sodium hydroxide, reacting the materials at reflux temperature to form a polymethylol phenol having a mole ratio of from 2.3 to 2.52 moles of formaldehyde per mole of phenol, cooling the mixture to arrest condensation, adding sulfuric acid and water to the mixture and keeping the temperature below 10° C., separating the condensate as a heavy syrup from an aqueous portion, and washing the condensate with water to free it from inorganic material, said polymethylol phenol being insoluble in water but soluble in alcohol.

2. An improved polymethylol phenol in the form of a heavy syrup having a combined formaldehyde-to-phenol mole ratio of from 2.3 to 2.52 and having a degree of condensation such that it is water insoluble but soluble in organic solvents including methanol, and being free of inorganic material.

3. A polymethylol phenol according to claim 2 having a range of viscosities of the original alkaline solution when at 25° C. and at a concentration of 47.2% of from 37 to 150 centipoises.

4. The resin-forming composition comprising a polymethylol phenol in the form of a heavy syrup having a mole ratio of combined formaldehyde-to-phenol of from 2.3 to 2.52 which is water insoluble containing no free formaldehyde and being free of inorganic material, and an alkali lignin which is free of inorganic material in admixture with the polymethylol phenol, said mixture being soluble in organic solvents including methanol and being condensible by heating to an insoluble, infusible resin which has low water absorption and high dielectric properties.

5. The resin-forming composition as defined in claim 4 which comprises up to four parts by weight of alkali lignin per part of polymethylol phenol.

6. The resin-forming composition in solution in an organic solvent comprising a polymethylol phenol in the form of a heavy syrup having a mole ratio of combined formaldehyde to phenol of from 2.3 to 2.52 which is water insoluble containing no free formaldehyde and being free of inorganic material, and an alkali lignin which is free of inorganic material, said composition being condensible by heating to an insoluble, infusible resin which has low water absorption and high dielectric properties.

7. The process of forming a condensation product of a polymethylol phenol having a combined formaldehyde-to-phenol ratio of from 2.3 to 2.52 condensed to a state of water insolubility and an alkali lignin which comprises dissolving the polymethylol phenol in the form of a heavy syrup and alkali lignin in aqueous ammonia, removing the water by evaporation, and condensing the polymethylol phenol and alkali lignin to an insoluble, infusible resin.

References Cited

UNITED STATES PATENTS

| | | | |
|---|---|---|---|
| Re. 19,710 | 9/1935 | Pollak et al. | |
| 2,520,913 | 9/1950 | Clark | 260—17.5 |
| 2,715,114 | 8/1955 | Huck | 260—57 |
| 2,610,939 | 9/1952 | Fischer et al. | 154—138 |
| 2,637,675 | 5/1953 | Bain | 154—138 |
| 1,946,459 | 2/1934 | Granger | 260—57 |
| 2,228,976 | 1/1941 | Rebovlet | 260—17.5 |
| 2,620,321 | 12/1952 | Schrader et al. | 260—57 |
| 2,659,710 | 11/1953 | Martin | 260—57 |
| 2,758,101 | 8/1956 | Shappell | 260—57 |
| 1,948,465 | 2/1934 | Bhagwat | 260—60 |
| 2,878,197 | 3/1959 | Baxter et al. | 260—17.5 |

(Other references on following page)

| | | |
|---|---|---|
| 1,614,171 | 1/1927 | Ammann et al. |
| 2,186,687 | 1/1940 | Thompson et al. |
| 2,636,017 | 4/1953 | Schwartzberg. |
| 2,673,190 | 3/1954 | Dietz. |

OTHER REFERENCES

Martin—"The Chemistry of Phenolic Resins," 1956, published John Wiley & Sons, Inc., New York, pages 23 and 24 relied on (Copy in Scientific Library).

Carswell—"Phenoplasts," published by Interscience Publishers Inc., New York, pages 9 and 10 relied on (Copy in Scientific Library).

Martin—"The Chemistry of Phenolic Resins," page 127 (Copy in Scientific Library).

A.P.C. Application of Sandig, Ser. No. 368,611 Published Apr. 20, 1943 (Copy in 260—57).

WILLIAM H. SHORT, *Primary Examiner.*

E. NIELSEN, *Assistant Examiner.*

U.S. Cl. X.R.

161—264; 260—17.2, 29.3, 33.4, 59, 60

UNITED STATES PATENT OFFICE
CERTIFICATE OF CORRECTION

Patent No. 3,454,508                      July 8, 1969

Franklin W. Herrick et al.

It is certified that error appears in the above identified patent and that said Letters Patent are hereby corrected as shown below:

Column 3, line 63, "consendation" should read -- condensation --; line 72, "resutling" should read -- resulting --. Column 4, lines 50 to 55, the formula should appear as shown below:

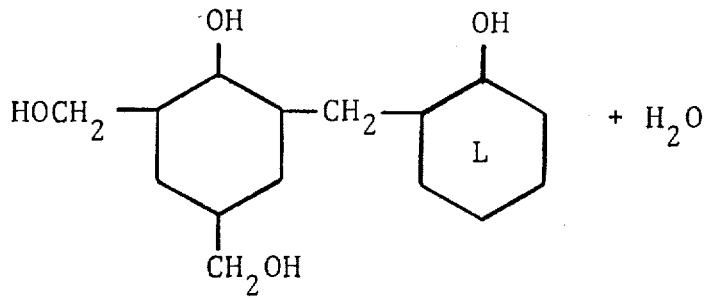

Column 5, line 49, "20-35° C." should read -- 20-25° C. --.
Column 8, line 1, "along" should read -- alone --.

Signed and sealed this 31st day of March 1970.

(SEAL)
Attest:

EDWARD M. FLETCHER, JR.            WILLIAM E. SCHUYLER, JR.
Attesting Officer                   Commissioner of Patents